May 28, 1935.  J. J. ROTHWELL, JR., ET AL  2,002,585
VARIABLE SPEED MECHANISM
Filed Aug. 16, 1933  2 Sheets-Sheet 1

INVENTORS
John J. Rothwell Jr.
Lemuel M. Stuart
BY
Walter J. Gill,
ATTORNEY

INVENTORS
John J. Rothwell Jr.
Lemuel M. Stuart
BY
Walter J. Gill.
ATTORNEY

Patented May 28, 1935

2,002,585

UNITED STATES PATENT OFFICE 2,002,585

VARIABLE SPEED MECHANISM

John J. Rothwell, Jr., Flushing, and Lemuel M. Stuart, Brooklyn, N. Y., assignors to Ford Instrument Company, Inc., Long Island City, N. Y., a corporation of New York Application August 16, 1933, Serial No. 685,312

12 Claims. (Cl. 74—198)

This invention relates to variable speed mechanism and more particularly to mechanism of this character in which a driving member, usually a rotatable disc, is operatively connected to a driven member, usually a rotatable roller, by a pair of members having spherical surfaces, such as balls, which are supported within a carriage that may be displaced radially with respect to the disc to correspondingly vary the speed ratio between the driving and driven members. Such devices are sometimes referred to as integrators or multipliers in view of the functions which they may perform by virtue of their variable speed characteristics.

In devices of this nature as heretofore constructed the spherical transmitting members or balls have been retained within their carriages by pairs of sets of rollers, each set consisting of a plurality of rollers, usually four, engaging the ball and rotatable about axes lying in a plane parallel to the driving disc. It has been found in practice that when the balls are located in the position in which no movement is imparted to the driven member, that is, when the balls are at the center of the disc, which may be called their neutral position, there is a tendency for the ball which engages the disc to wear a depression in the latter, especially when the disc is rotating at relatively high speeds, which may in time become of sufficient depth to interfere with the ready displacement of the ball from its neutral position or even to prevent such displacement. The same tendency but to a lesser degree exists when the balls are displaced from their neutral position. When such conditions of wear occur, repair or replacement of the disc is sooner or later required.

It is an object of this invention to provide a variable speed mechanism in which the above noted disadvantage of the prior devices shall be substantially overcome with consequent lessening of the necessity for repairing or replacement. This advantage is attained by a structure which contains a relatively small number of parts in addition to those required in the prior devices.

The principle of the invention and other objects and advantages thereof will appear most clearly from a description of a preferred embodiment as shown in the accompanying drawings in which:—

Figure 1:
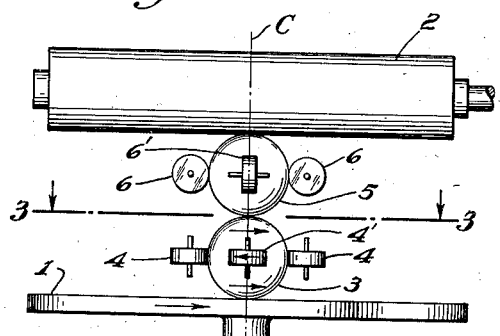
Fig. 1 is a simplified diagram in elevation of the device to aid in explaining its principles and showing the balls in one position.

Before describing the preferred embodiment of the invention in detail, the principles underlying it will be explained with the aid of Figs. 1 to 4 inclusive. In these figures, 1 designates a driving member in the form of a disc rotatable about the axis C—C which will hereinafter be referred to as the center line of the device. A driven member 2, in the form of a roller, is arranged with its axis of rotation parallel to the disc 1. A lower ball 3 is in contact with the disc and is maintained in place by a pair of rollers 4, and another pair 4¹, both pairs being suitably mounted in a carriage which has been omitted for the sake of clearness. An upper ball 5 engages ball 3 and the roller 2 and is maintained in place by a pair of rollers 6 and a second pair 6¹, all suitably mounted in the supporting carriage.

It is a well known physical principle that a spherical member, such as a ball, when rolling in a circle upon a plane surface will spin about an axis which if prolonged will intersect the surface at the center of the circle traversed by the ball. If on the other hand, the ball be relatively fixed and the surface be rotatable in its own plane, the rolling movement imparted to the ball will be about an axis which will intersect the surface at its center of rotation.

Figure 3:
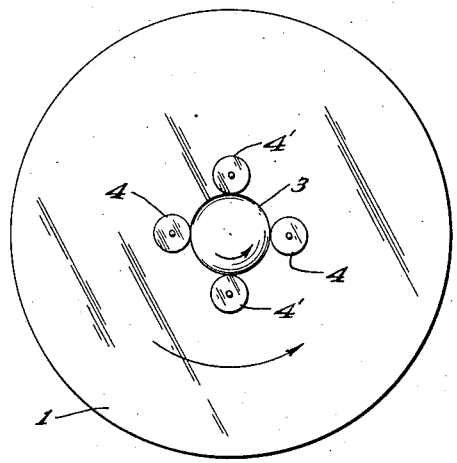
Fig. 3 is a simplified diagram in plan with the parts above the section line 3—3 of Fig. 1 removed and showing the lower ball in the same position as in Fig. 1.

Applying this principle to the device shown in simplified form in Figs. 1 and 3, the lower ball 3 when at the center of the disc, will naturally spin about the center line C—C as an axis since this is the only axis of the ball which intersects the disc at its center of rotation. The arrows upon the ball indicate that it is spinning about the axis C—C. In order that the device may function most efficiently, it is necessary to not only make the load on the balls a minimum but also to apply it in a manner that will not disturb the natural spinning axes of the balls. The load on the lower ball may be divided into two parts, that which is applied by the output torque of the device and that which is applied by the rollers which engage the ball to retain it in place in the carriage by which its position relatively to the disc may be altered. Insofar as the last named part of the load is concerned, it is necessary in order to make it a minimum and to prevent distortion of the natural spinning axis of the ball, to have rolling contact between the ball and the retaining rollers 4 and 4¹.

It has been explained in connection with prior mechanisms of this general type that their balls are retained by rollers, the axes of which lie in planes parallel to the driving disc. This means that when the balls are in their neutral position, in which case the lower ball tends to rotate about an axis perpendicular to the disc in accordance with the principle stated above, the planes of rotation of the rollers are perpendicular to the plane of rotation of the ball, so that the condition of rolling contact between the ball and its retaining rollers does not then exist. Under these circumstances, if the friction between the ball and the rollers exceeds the driving friction between the ball and the disc, the ball will be prevented from spinning about its natural axis and will consequently tend to wear away the disc at the point where it engages the latter, due to the relative movement between it and the disc.

In accordance with this invention, the rollers for retaining the lower ball are so arranged that in any position of the ball with respect to the disc, rolling contact between the rollers and the ball will occur so that even when the balls occupy their neutral position the lower ball is free to rotate about an axis perpendicular to the disc. This condition is illustrated in Figs. 1 and 3 in which the balls 3 and 5 lie upon the center line C—C and the rollers 4 and 4' for the lower ball 3 are arranged to rotate about axes parallel to the spinning axis of the ball.

Figure 2:
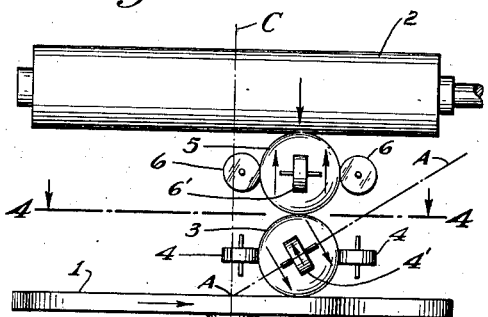
Fig. 2 is a similar diagram showing the balls in another position.
Figure 4:
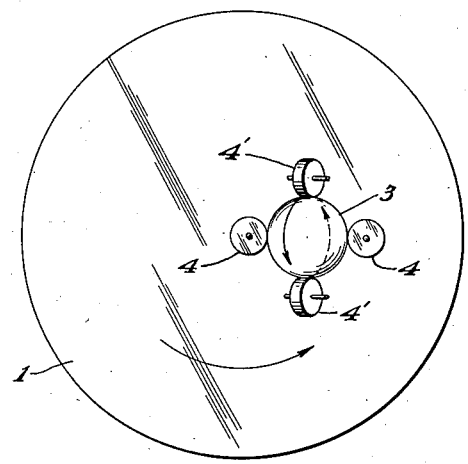
Fig. 4 is a diagram similar to Fig. 3, but showing the lower ball in the position it occupies in Fig. 2.

In Figs. 2 and 4 are shown the conditions when the balls are displaced from the center line C—C. In accordance with the principle stated above, the ball 3 will tend to rotate, as indicated by the arrows thereon, about an axis A—A intersecting the disc 1 at its center. In order that the ball may be permitted to rotate about the natural axis and the conditions of rolling contact between the ball and the two rollers 4¹ may exist, it is necessary that the axes of these rollers lie parallel to the natural spinning axis A—A of the ball. It is therefore required that the axes of these rollers be tilted from the position shown in Fig. 1 to that shown in Fig. 2 when the ball 3 is correspondingly moved. Suitable mechanism for producing the required tilting of the axes of these two rollers in accordance with the displacement of the ball from its neutral position will be described hereinafter in connection with the description of the complete device.

As far as the two rollers 4 are concerned, no tilting of their axes is required since these rollers are under all conditions in rolling contact with the ball.

In the prior devices described above, when the balls occupy a position comparable to that illustrated in Figs. 2 and 4, the pair of rollers 4¹ of the lower ball which have been shown tilted in these figures are in such devices arranged like the other pair of rollers, i. e., with their axes parallel to the disc of the device, so that rolling contact will not exist between the lower ball and any of its retaining rollers. This condition will prevent the free rolling of the ball about its natural spinning axis with a tendency for the ball to wear away the disc but to a lesser degree than when the ball occupies its neutral position.

As far as the upper ball 5 is concerned, it will rotate about an axis parallel to the axis of the roller 2 with which it is in engagement, except in the neutral position shown in Fig. 1 in which case no movement is imparted to this ball by the lower ball 3 since the balls have point contact at the end of the spinning axis of the lower ball. In other positions, such as illustrated in Fig. 2, the upper ball will rotate about an axis parallel to the axis of the roller 2, as indicated by the arrows placed upon this ball. The two rollers 6¹ will have rolling contact with the ball since their axes are parallel to the spinning axis of the ball. The other pair of rollers 6 have point contact with the ball at the ends of its spinning axis where the friction between the ball and these rollers will be substantially negligible. Under these circumstances these rollers could, if desirable, be replaced by elements fixed in relation to the ball shifting carriage.

Referring to Figs. 5 to 8 inclusive which show in detail a preferred embodiment of the invention, 7 designates a base on which the disc 1 is rotatably supported by balls 8 within an annular retainer 9. In order to insure that the disc is properly centered under all conditions, the base is provided with a stud 10 which projects within an annular boss 11 formed on the lower side of the disc 1. A ball bearing 12 is placed between the boss and the inner end of the stud. The periphery of the disc 1 is provided with teeth 13 which engage a pinion 14 on the end of a shaft 15 extending to a suitable source of power by which the disc may be driven.

Figure 5:
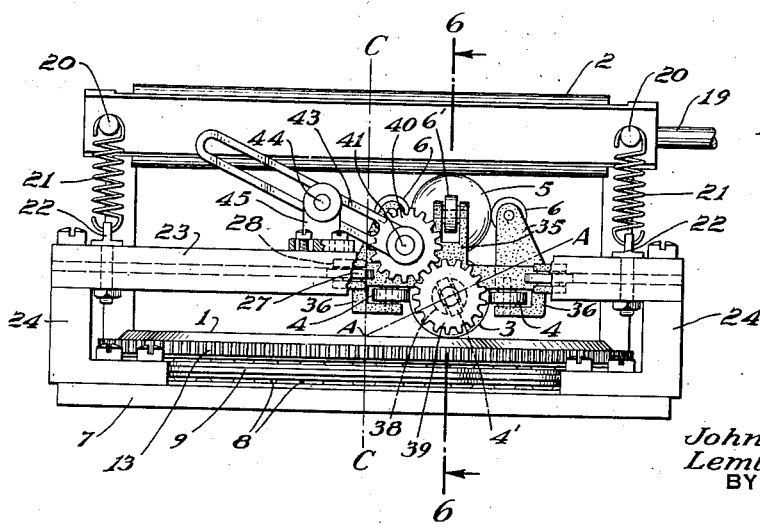
Fig. 5 is a view in elevation of the device with parts broken away to more clearly reveal other parts, the balls being shown in substantially the same position as in Fig. 2.
Figure 6:
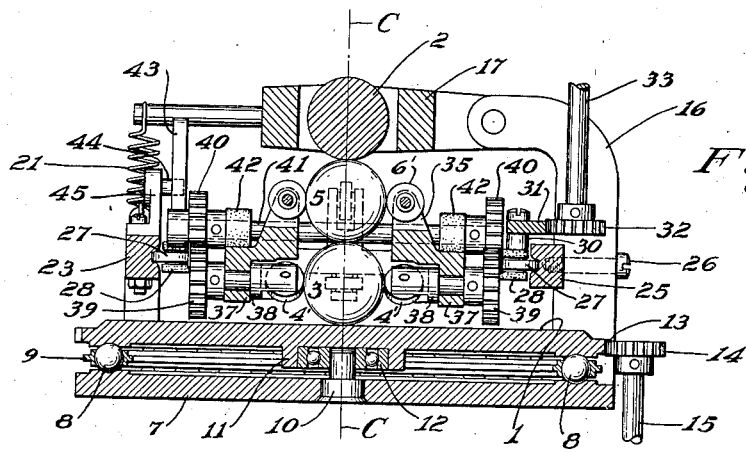
Fig. 6 is another elevational view of the device, chiefly in section along the line 6—6 of Fig. 5.
Figure 7:
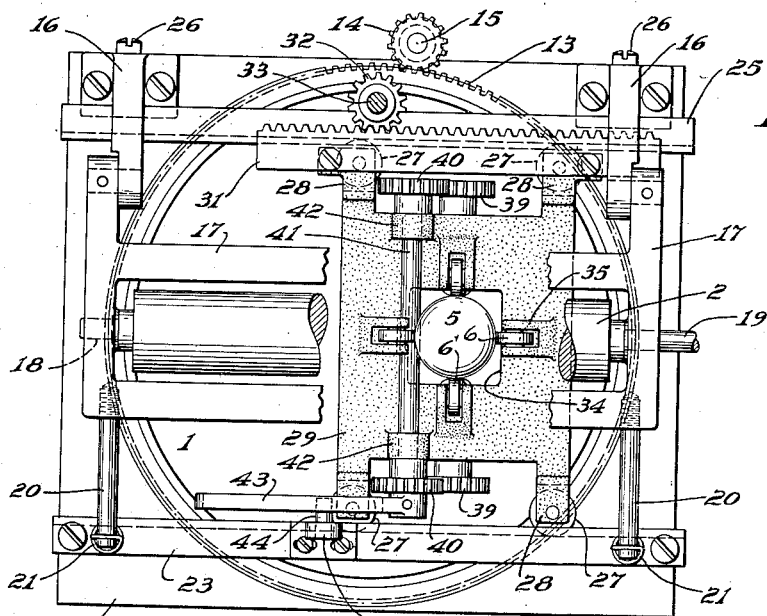
Fig. 7 is a plan view of the device with portions of the roller and its associated elements broken away to more clearly show parts lying beneath them.
Figure 8:
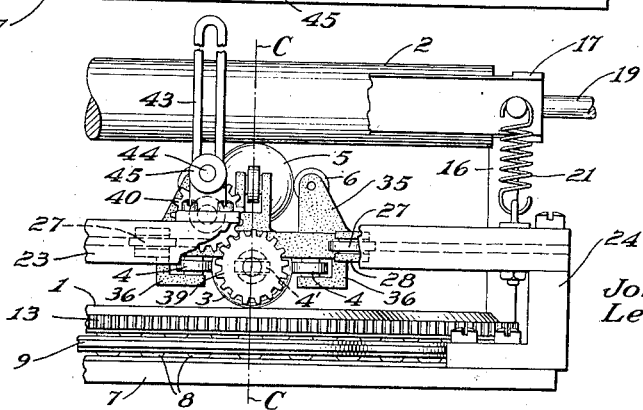
Fig. 8 is a view similar to Fig. 5 but showing the balls located at their neutral position.

As shown most clearly in Figs. 6 and 7, the base 7 carries a pair of standards 16 having inwardly extending free ends to which is pivotally attached a frame 17, within which the roller 2 is rotatably mounted by a stub shaft 18 at one end and an extended shaft 19 at the other end, the latter shaft leading to the device to which the movement of the roller is to be transmitted. The frame 17 carries a pair of pins 20 to the free ends of which are connected springs 21 attached to bolts 22 passing through a bar 23 which also serves as one guide for the ball carriage of the mechanism. The bar is carried on supports 24 attached to the base 7 as shown most clearly in Fig. 5.

A companion guide bar 25 is attached to the standards 16 by screws 26 as shown most clearly in Fig. 6. This figure also shows that the inner faces of the guide bars are slotted to receive rollers 27 mounted between lugs 28 at the corners of a plate 29 constituting a part of the ball carriage of the mechanism. One side of the carriage is provided with a pair of posts 30 for supporting a rack bar 31, which engages a pinion 32 on the end of a shaft 33, the rotation of which through the elements just described translates the ball carriage along the guide bars within which it is mounted.

As shown most clearly in Fig. 7, the plate 29 is provided with a rectangular aperture 34 at the sides of which are upwardly extending bifurcated lugs 35 which carry the rollers 6 associated with the upper ball 5. Depending from the plate 29, as shown most clearly in Fig. 5, is a pair of rectangular lugs 36 carrying between them and the plate the two rollers 4 which as shown in Figs. 1 and 2 lie to the left and right of the ball 3, i. e., those rollers which have their axes perpendicular to the disc 1 in all positions of the ball carriage. As shown most clearly in Fig. 6, a second pair of lugs 37, depending from the plate 29 carry shafts 38 having bifurcated inner ends to support the two rollers 4¹ which have been shown in Figs. 1 to 4 inclusive, as those which are tiltable in accordance with the position of the ball carriage. The other ends of these shafts carry pinions 39 which mesh with pinions 40 on the ends of a shaft 41 mounted in lugs 42 projecting upwardly from the plate 29. A slotted arm 43 is attached to one end of the shaft 41 and receives a pin 44 carried by a bracket 45 adjustably attached to the guide bar 23 to permit the pin 44 to be accurately set with respect to other elements of the device.

In the operation of the mechanism described above, the disc 1 is driven at constant speed by the source of power to which the shaft 15 is connected. Assuming that the ball carriage occupies such a position that the balls 3 and 5 lie exactly on the center line C—C, i. e., their neutral position as shown in Fig. 1, the balls and associated devices will occupy the positions shown in Fig. 8. The pairs of gears 39 and 40, the arm 43 connected to the last named pair of gears, and the pin 44 attached to the guide bar 23 are so proportioned and related to each other that under these conditions the arm will occupy a position perpendicular to the disc 1 and the bifurcated ends 37 of the shafts 38 will be so disposed that the rollers 4 mounted therein will lie parallel to the disc as has been previously described in connection with Figs. 1 and 2, in which case the ball 3 spins about the center line C—C as an axis, and no movement is imparted to the roller 2 by the ball 5.

If the ball carriage be translated to the position shown in Figs. 5 and 7 by manipulation of the shaft 33, as above described, the movement imparted to the arm 43 as its slot passes over the fixed pin 44 will cause the arm to be tilted into the position shown in Fig. 5 with consequent rotation of the shaft 41 and gears 40 carried thereon. These gears will through the gears 39 turn the shafts 38 and rollers 4 into the position in which the axes of the rollers are parallel to the line A—A representing the spinning axis of the ball 3 as previously explained in connection with Fig. 2. The ball 3 will then drive the ball 5 to cause corresponding rotation of the roller 2, the output of which will be taken off of the mechanism by the shaft 19.

While a preferred embodiment of the invention has been shown and described, it will be understood that it may be embodied in other forms and that various changes in the structural details may be made without departing from the principle of the invention as defined in the appended claims.

We claim:—

1. In a variable speed mechanism including driving and driven rotary members and a spherical transmitting member between them having rolling contact with the driving member, a shifting device with which the transmitting member is adjustable radially of the driving member, antifriction retainers for the transmitting member displaceable with the shifting device and comprising two opposing rollers contacting with the transmitting member, and means operable upon displacement of the shifting device to alter the angular relation of the axes of the rollers to said device to maintain the axes of the rollers in a plane with the axis of rotation of the transmitting member in all positions of the transmitting member.

2. In a variable speed mechanism including driving and driven rotary members and a spherical transmitting member between them having a rolling contact with the driving member, a linearly displaceable shifting device with which the transmitting member is adjustable radially of the driving member, antifriction retainers for the transmitting member displaceable with the shifting device and comprising two opposing rollers having angularly displaceable axes of rotation, said rollers contacting with the transmitting member, and means responsive to the linear displacement of the shifting device to angularly displace the axes of rotation of the rollers to maintain said axes of the rollers in a plane with the axis of rotation of the transmitting member and parallel with a plane tangent to the transmitting member at the respective points of contact of the rollers in all positions of the transmitting member.

3. In a variable speed mechanism including driving and driven rotary members and a spherical transmitting member between them having rolling contact with the driving member, a shifting device with which the transmitting member is adjustable radially of the driving member, two pairs of antifriction retainers for the transmitting member, means for holding one pair of retainers in engagement with the transmitting member and in a constant relation to the driving member in all positions of the transmitting member, and means for holding the other pair of retainers in engagement with the transmitting member operable to angularly adjust the last named pair of retainers to maintain them in a predetermined relation to the axis of rotation of the transmitting member in all positions of the transmitting member.

4. In a variable speed mechanism including driving and driven rotary members and a spherical transmitting member between them having rolling contact with the driving member, a shifting device with which the transmitting member is adjustable radially of the driving member, antifriction retainers for the transmitting member comprising two pairs of opposing rollers contacting with the transmitting member, means for holding the axes of the rollers of one pair in a constant relation to the axis of the driving member, and means operable concomitantly with the adjustment of the shifting device to adjust the axes of the rollers of the other pair to maintain the same in a predetermined relation to the axis of rotation of the transmitting member, in all positions of the transmitting member.

5. In a variable speed mechanism including driving and driven rotary members and a spherical transmitting member between them having rolling contact with the driving member, a shifting device with which the transmitting member is adjustable radially of the driving member, antifriction retainers for the transmitting member, comprising two pairs of opposing rollers contacting with the transmitting member, means for holding the axes of the rollers of one pair parallel to the axis of the driving member, and means operable in response to the adjustment of the shifting device radially of the driving member to adjust the axes of the rollers of the other pair to maintain the same parallel to the axis of rotation of the transmitting member, in all positions of the transmitting member.

6. In a variable speed mechanism including driving and driven rotary members and a spherical transmitting member between them having rolling contact with the driving member, a shifting device with which the transmitting member is adjustable radially of the driving member, two opposing laterally angularly displaceable anti-friction retainers contacting with the transmitting member, and operating means in part fixed against movement with the shifting device and having elements actuated by the adjustment of the shifting device co-acting with the fixed part of the operating means to be effective to adjust the retainers to maintain the same in a predetermined relation to the axis of rotation of the transmitting member in all positions of the transmitting member.

7. In a variable speed mechanism including rotary driving and driven elements, a spherical transmitting member between the elements, a carriage, and means for moving the carriage relatively to the elements, the combination of a pair of retainers for the transmitting member mounted on the carriage in fixed relation thereto, a second pair of retainers for the transmitting member mounted on the carriage in movable relation thereto, and a device operable in accordance with the movement of the carriage for adjusting the second pair of retainers to maintain them in a predetermined relation to the spinning axis of the transmitting member in all positions of the carriage.

8. In a variable speed mechanism including rotary driving and driven elements, a spherical transmitting member between the elements, a carriage, and means for moving the carriage relatively to the elements, the combination of a pair of rollers contacting with the transmitting member and mounted on the carriage for rotation about axes having a fixed relation to the carriage, a second pair of rollers contacting with the transmitting member and mounted on the carriage for rotation about axes having a variable relation to the carriage and a device operable in accordance with the movement of the carriage for adjusting the second pair of rollers to maintain their axes in predetermined relation to the spinning axis of the transmitting member in all positions of the carriage.

9. In a variable speed mechanism including rotary driving and driven elements, a spherical transmitting member between the elements, a carriage, and means for moving the carriage relatively to the elements, the combination of a pair of supports mounted on the carriage, a roller movably mounted in each support and contacting with the transmitting member, a second pair of supports mounted on the carriage, a shaft mounted in each support, a roller mounted on each shaft to be movable therewith and contacting with the transmitting element, and means operable in accordance with the movement of the carriage for adjusting the shafts to maintain the rollers in a predetermined relation to the spinning axis of the transmitting member in all positions of the carriage.

10. A variable speed mechanism comprising a rotary driving element, a rotary driven element, a plurality of spherical transmitting members interposed between said elements in rolling contact with each other and the driving and driven elements respectively, a plurality of retainers for the transmitting member which contacts with the driven element, said retainers bearing a constant relation to the axis of that element, a plurality of pairs of retainers for the transmitting member which contacts with the driving element, one of said pairs of retainers bearing a constant relation to the axis of that element, and means for maintaining another pair of retainers in a predetermined relation to the axis of rotation of the transmitting member with which they contact in all positions of the transmitting members.

11. A variable speed mechanism comprising a rotary driving element, a rotary driven element, a plurality of spherical transmitting members interposed between said elements in rolling contact with each other and the driving and driven elements respectively, a carriage, means for moving the carriage relatively to the members, a plurality of retainers for the transmitting member which contacts with the driven element, said retainers being mounted on the carriage in fixed relation thereto, a plurality of pairs of retainers for the transmitting member which contacts with the driving element, one of the pairs of retainers being mounted on the carriage in fixed relation thereto and another pair of retainers being mounted on the carriage in movable relation thereto, and a device operable in accordance with the movement of the carriage for adjusting the second named pair of retainers to maintain them in a predetermined relation to the spinning axis of the transmitting member with which they co-act in all positions of the carriage.

12. In a variable speed mechanism including rotary driving and driven elements, a spherical transmitting member between the elements, a carriage, and means for moving the carriage relatively to the elements, the combination of a pair of supports mounted on the carriage, a roller movably mounted in each support and contacting with the transmitting member, a second pair of supports mounted on the carriage, a shaft mounted in each support, a roller mounted on each shaft to be movable therewith and contacting with the transmitting element, a gear attached to each shaft, a third shaft mounted on the carriage, gears on the third shaft engaging said gears, a slotted arm attached to the third shaft, and a fixed pin extending into the slot in the arm.

JOHN J. ROTHWELL, Jr.
LEMUEL M. STUART.